United States Patent [19]

King, Sr. et al.

[11] Patent Number: 5,067,590

[45] Date of Patent: Nov. 26, 1991

[54] METHOD FOR FILLING A PRESSURIZED LUBRICANT DISPENSING CHAMBER

[75] Inventors: James L. King, Sr.; James L. King, Jr., both of Rock Falls; John Pope, Sterling, all of Ill.

[73] Assignee: Sauk Valley Equipment Company, Rock Falls, Ill.

[21] Appl. No.: 586,191

[22] Filed: Sep. 21, 1990

Related U.S. Application Data

[62] Division of Ser. No. 329,562, Mar. 28, 1989, Pat. No. 4,977,979.

[51] Int. Cl.⁵ .................... F16N 13/22; B65B 3/12
[52] U.S. Cl. ........................ 184/15.1; 141/2; 141/5; 141/6; 141/18; 222/56
[58] Field of Search ............. 184/15.1; 141/2, 5, 141/6, 18; 222/56

[56] References Cited

U.S. PATENT DOCUMENTS

| | | | |
|---|---|---|---|
| 2,149,127 | 2/1939 | Tear | 222/56 |
| 3,170,539 | 2/1965 | Snay | 184/15.1 |
| 3,272,238 | 9/1966 | Groppe | 141/5 |
| 3,851,795 | 12/1974 | Anderson | 141/12 |
| 4,485,941 | 12/1984 | Frates | 222/146.5 |
| 4,516,700 | 5/1985 | Guzowski | 222/334 |
| 4,709,515 | 12/1987 | Copeland | 222/132 |

Primary Examiner—Douglas Hart
Attorney, Agent, or Firm—Wood, Phillips, Mason, Recktenwald & Van Santen

[57] ABSTRACT

A system for the lubrication of a drive chain of a conveyor includes a container precharged with pressurized air and at least partially filled with lubricant. A pressure regulator located within the interior of the container is connected, at one end, to a container outlet and, at the other end, to a conduit for the flow of lubricant. An adjustable needle valve located externally of the container is connected to the conduit for regulating the flow of lubricant. A solenoid valve is connected to the conduit downstream of the needle valve for controlling the flow of lubricant, and a nozzle is located downstream of the solenoid valve for dispensing a lubricant onto the drive chain.

4 Claims, 2 Drawing Sheets

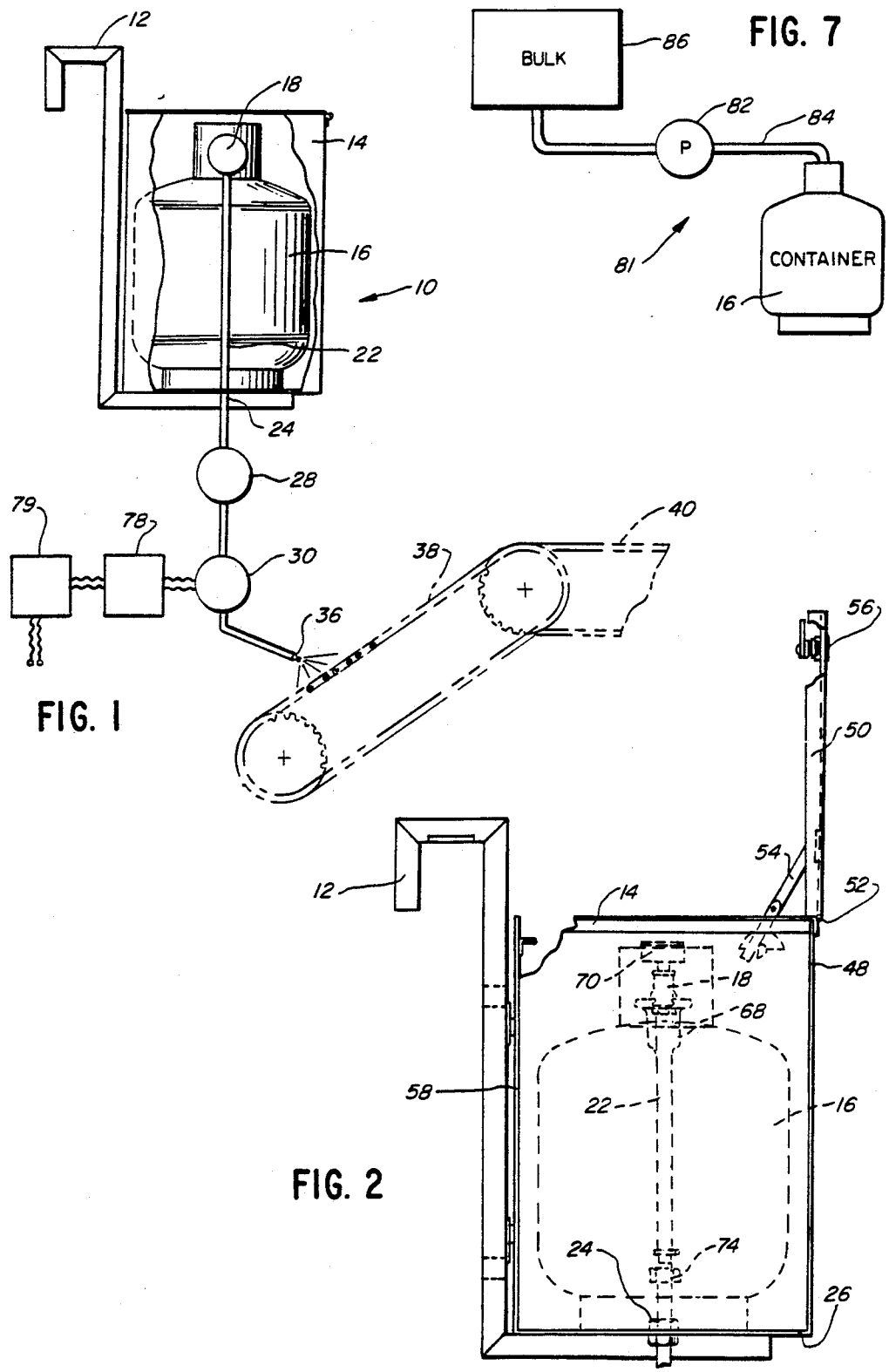

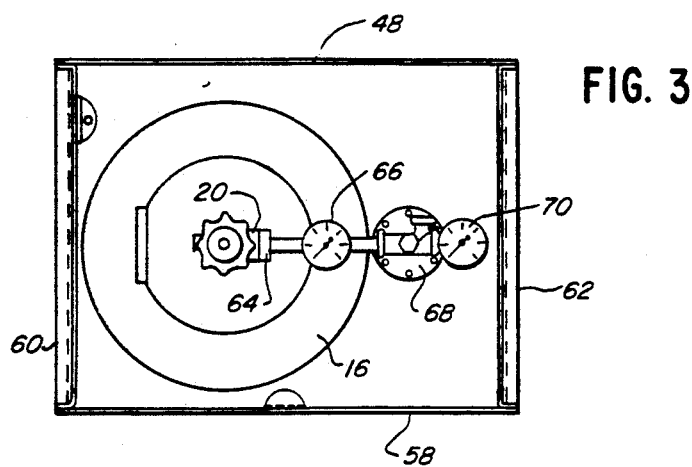
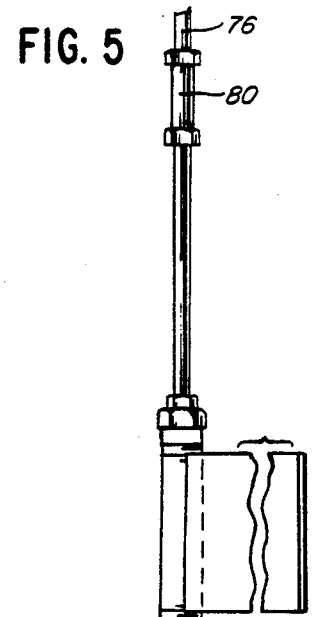
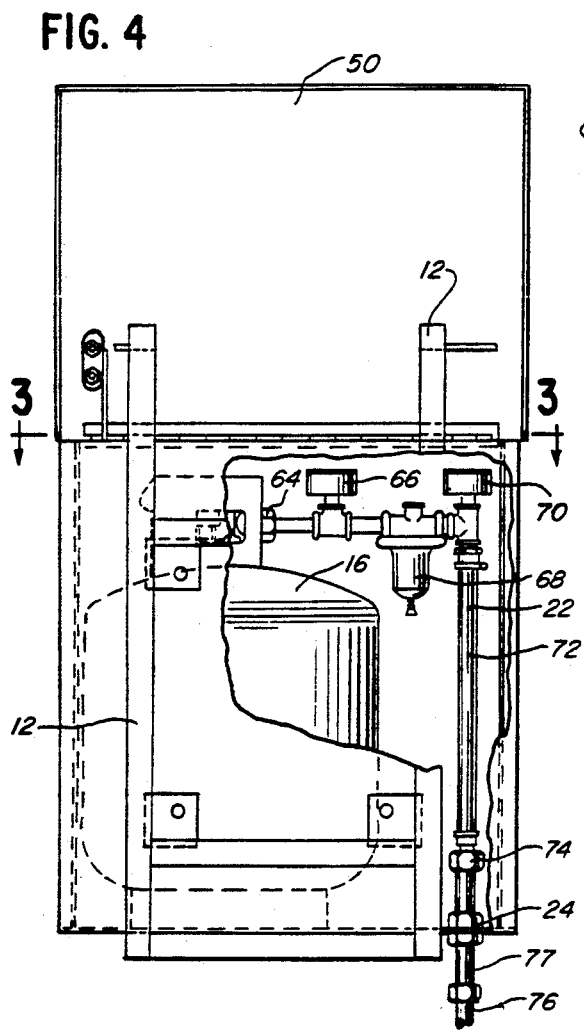
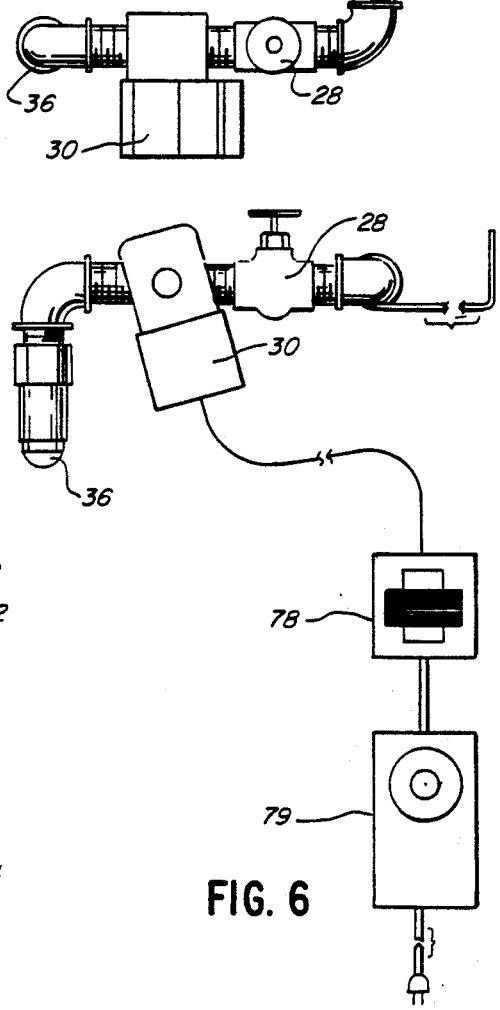
FIG. 3
FIG. 4
FIG. 5
FIG. 6

METHOD FOR FILLING A PRESSURIZED LUBRICANT DISPENSING CHAMBER

This is a division of application Ser. No. 329,562, filed Mar. 28, 1989, now U.S. Pat. No. 4,977,979, granted Dec. 18, 1990.

FIELD OF THE INVENTION

This invention relates to a method for filling a pre-pressurized lubricant dispensing container.

BACKGROUND OF THE INVENTION

Prior art lubrication systems, such as is shown in Burchsted, U.S. Pat. No. 2,593,841 use a reservoir wherein a lubricant is mixed with compressed air introduced through a through a solenoid valve.

A similar lubrication system is shown in Stoner, U.S. Pat. No. 3,684,059 wherein air is used to dispense oil from a tank through a solenoid valve, and then to a nozzle. A switch operates a timer to open the solenoid valve.

It is desirable to have a lubrication system which does not require that compressed air be supplied through a pipe or the like and a method for filling a prepressurized lubricant dispensing chamber.

SUMMARY OF THE INVENTION

It is an object of the invention to provide a lubrication system for a drive chain of a conveyor utilizing a pre-pressurized lubricant reservoir.

In accordance with the invention, the system includes a container precharged with pressurized air and at least partially filled with lubricant, the container having an outlet for the lubricant.

A feature of the invention is the utilization of a pump for charging the pressurized container with lubricant. The pump has an inlet connected to a supply of lubricant and an outlet connected to the container.

Further features and advantages of this invention will readily be apparent from the specification and from the drawings.

BRIEF DESCRIPTION OF THE DRAWINGS

FIG. 1 is a schematic diagram illustrating a lubrication system according to the present invention;

FIG. 2 is a front view illustrating the cabinet and lubricant container therein with a portion of the cabinet front wall broken away;

FIG. 3 is a top view of the cabinet and container taken along line 3—3 of FIG. 4;

FIG. 4 is a side view of the cabinet and container;

FIG. 5 is a top view of the nozzle of the lubrication system;

FIG. 6 is a side view of the nozzle; and

FIG. 7 is a schematic diagram of the system for charging a lubricant container.

DESCRIPTION OF THE INVENTION

A lubrication system 10 according to the present invention includes a support structure 12 for a cabinet 14 within which is located a container 16 precharged with pressurized air and at least partially filled with lubricant. A pressure regulator 18 which regulates the discharge pressure of the lubricant within the cabinet 14 and is connected to a container outlet 20 (FIG. 3). A conduit 22, which is connected to the pressure regulator 18, extends from within the interior of the cabinet 14 through an aperture 24 located in a bottom wall 26 to a needle valve 28 which may be adjusted to control the rate of flow of lubricant flow therethrough. In turn, the needle valve 28 is connected to a solenoid valve 30 which starts and stops the lubricant flow to nozzle 36 and to the drive chain 38 of a conveyor 40.

The container 16 is stored in a cabinet 14, FIGS. 2–4, which comprises a front wall 48 including a top portion to which a lid 50 is attached by means of a hinge 52. The lid 50 has a bracket 54 allowing the lid 50 to remain in an open position, and a lock 56. Further, the cabinet comprises a back wall 58 including a Z-shape support structure 12 fixed thereto, side walls 60, 62, and a bottom wall 26 including an aperture 24 for the passage of said conduit 22 from the interior of the cabinet 14 to the exterior of the cabinet 14.

The pressure regulator 18, FIG. 2, is connected to the container outlet 20 by means of an adapter 64. The pressure regulator 18 includes a gauge 66 showing the pressure in the container 16, a regulator 68, and a gauge 70 showing the discharge pressure to the dispensing nozzle 36. In a typical operation, the container pressure is 200 p.s.i. with the container filled and discharge pressure is approximately 35 lbs. p.s.i. The conduit 22 located within the cabinet 14 is comprised of a hydraulic hose 72 and includes a coupling 74 near the aperture 24. External of the cabinet 14, the hose 72 is connected to copper tubing 76 by means of a bulkhead union 77.

As shown in FIGS. 5 and 6, the copper tubing 76 is connected to the adjustable needle valve 28, and then to the 24 volt solenoid valve 30. As shown in FIG. 6, the solenoid valve 30 is wired to a 24 volt transformer 78. In turn, the transformer 78 is connected to a 120 volt timer 79. The timer 79 is wired directly to the power drive for the conveyor (not shown) so that the timer 79 is activated only when the conveyor is in operation. In the present invention, the timer 79 is a 24 hour timer which can be set for a minimum of 2 minutes and a maximum of 27½ minutes up to four times every 24 hours.

When desired hour setting for lubrication has been reached, the timer 79 causes the solenoid valve 30 to open and discharge measured quantities of lubricant through the nozzle 36 to the drive chain 38. It is understood that the rate at which the lubricant is discharged may be varied dependent upon lubricant viscosity, nozzle tip size, and conveyor drive chain length. As further shown in FIG. 5, the copper tubing 76 may be connected to a compression Tee 80 to allow for the connection of an additional nozzle.

According to the present invention, the container 16 is initially pre-pressurized with compressed air. Thereafter, lubricant is pumped into the container 16 until the pressure within container 16 rises to a desired pressure. As the lubricant is dispensed, the pressure within container 16 will correspondingly drop. Before the pressure within container 16 reaches the pressure of the compressed air, it is recharged with lubricant.

In a typical system, a container is initially pre-pressurized with compressed air at approximately a shop pressure of 100 lbs. p.s.i. before the lubricant is pumped into the container. After the container is pre-pressurized, the container 16 is half-filled with lubricant such that the pressure within container 16 reaches 200 p.s.i. When the container 16 reaches 200 p.s.i., it will contain, for example, approximately 2.5 lbs. of lubricant. As described above, the pressure within container 16 will drop as the lubricant is dispensed. When the lubricant pressure in container 16 gets within 20 lbs. p.s.i. of the initial shop air supply pressure, i.e., 120 lbs. p.s.i., the container 16 will be recharged. If the pressure within container 16 drips to the initial shop air supply of 100 lbs. p.s.i., there will be no lubricant remaining and all that is dispensed under this condition is foamy oil and air.

According to the present invention, the container 16 is recharged through the use of the system, generally designated 81, depicted in FIG. 7. As shown therein, a pump 82 has an inlet which is connected by means of a conduit 84, at one end, to a bulk supply of lubricant 86 and a discharge outlet which is connected, at the other end, to the outlet of the container 20 (FIG. 4). Since the pump 82 used in this particular application has the capability of a 200 p.s.i. discharge, the pump 82 will stall when the pressure within container 16 reaches 200 p.s.i.

The invention thus provides a lubrication system including a container pre-pressurized with air and partially filled with lubricant such that the lubrication system need not include a source of compressed air supplied through a pipe or the like.

What is claimed:

1. The method of dispensing lubricant from a refillable pressurized container, comprising:
   (1) providing a container pressurized with gas;
   (2) providing a pump having an inlet and a discharge outlet;
   (3) providing a supply of lubricant;
   (4) connecting the pump inlet with said supply of lubricant;
   (5) connecting said pump discharge outlet with said container;
   (6) pumping lubricant from said supply into said container until the container is partially filled with lubricant and the back pressure in the container stalls the pump;
   7) dispensing lubricant from the container under pressure of the gas therein; and
   (8) repeating step (6) to refill said container before the lubricant in the container is exhausted.

2. The method of claim 1 in which lubricant is pumped from said supply into said container until the pressure within said container is on the order of twice the pressure provided in the container according to step (1).

3. The method of claim 2 in which the container according to step (1) is pressurized at approximately 100 psi and in which lubricant is pumped from said supply into said container until the container pressure is approximately 200 psi.

4. The method of claim 1 in which said container is refilled with lubricant when the pressure within said container drips to approximately 60 percent of the pressure existing in the container after the container is partially filled with lubricant according to step (6).

* * * * *